(12) United States Patent
Fitzgerald

(10) Patent No.: US 12,441,423 B2
(45) Date of Patent: Oct. 14, 2025

(54) CARGO CYCLE

(71) Applicant: James Fitzgerald, Leiston (GB)

(72) Inventor: James Fitzgerald, Leiston (GB)

(*) Notice: Subject to any disclaimer, the term of this patent is extended or adjusted under 35 U.S.C. 154(b) by 59 days.

(21) Appl. No.: 18/552,379

(22) PCT Filed: Mar. 28, 2022

(86) PCT No.: PCT/GB2022/050761
§ 371 (c)(1),
(2) Date: Sep. 25, 2023

(87) PCT Pub. No.: WO2022/200813
PCT Pub. Date: Sep. 29, 2022

(65) Prior Publication Data
US 2024/0182128 A1    Jun. 6, 2024

(30) Foreign Application Priority Data

Mar. 26, 2021   (GB) .................... 2104322

(51) Int. Cl.
| | | |
|---|---|---|
| B62J 9/22 | (2020.01) | |
| B62J 9/27 | (2020.01) | |
| B62J 9/28 | (2020.01) | |
| B62K 7/02 | (2006.01) | |
| B62K 11/02 | (2006.01) | |
| B62M 1/36 | (2013.01) | |

(52) U.S. Cl.
CPC . *B62J 9/22* (2020.02); *B62J 9/27* (2020.02); *B62J 9/28* (2020.02); *B62K 7/02* (2013.01); *B62K 11/02* (2013.01); *B62M 1/36* (2013.01)

(58) Field of Classification Search
CPC ....... B62J 9/22; B62J 9/27; B62J 9/28; B62K 7/02; B62K 11/02; B62M 1/36; B60R 9/10
See application file for complete search history.

(56) References Cited

FOREIGN PATENT DOCUMENTS

| | | |
|---|---|---|
| DE | 202008014124 U1 | 2/2009 |
| DE | 102015004977 A1 | 10/2016 |
| JP | 2009179285 A | 8/2009 |
| WO | 2010143155 A2 | 12/2010 |
| WO | 2020202218 A1 | 10/2020 |

OTHER PUBLICATIONS

International Search Report and Written Opinion of the International Searching Authority, issued in connection with Intn'l Appl. No. PCT/GB2022/050761, dated Sep. 22, 2022 (13 pages).

*Primary Examiner* — Derek J Battisti
(74) *Attorney, Agent, or Firm* — HOLLAND & HART LLP

(57) ABSTRACT

The present invention relates to the field of cargo cycles, particularly electric cycles for loading and delivery of cargo. There is provided a cargo cycle (10) comprising a substantially arcuate frame (11), at least one front wheel (12) pivotally mounted towards a front end of the frame, at least one rear wheel (13) pivotally mounted towards a rear end of the frame, and a propulsion drive (15), wherein the frame defines a cargo storage area located under the frame (11) and between the front (12) and rear wheels (13).

14 Claims, 18 Drawing Sheets

US 12,441,423 B2

CARGO CYCLE

CROSS-REFERENCE TO RELATED APPLICATIONS

This is a national phase application of International Application No. PCT/GB2022/050761, filed 28 Mar. 2022, which claims the benefit of GB Patent Application No. 2104322.9, filed 26 Mar. 2021, the disclosures of which are incorporated herein, in their entireties, by this reference.

TECHNICAL FIELD

The present invention relates to the field of cargo cycles, particularly electric cycles for loading and delivery of cargo.

Cargo cycles are known in the art and provide methods for transporting cargo from storage to a desired destination. The cycles require a user to load/unload and drive the cycle between collection to delivery locations.

Conventionally, cargo cycles comprise onboard storage compartments and frame structures comprising multiple sections designed to house cargo which is intended for delivery. Storage compartments for cargo are typically integral to the cycle, with the goods being loaded or unloaded from the storage compartments of the cycle.

In particular, it is usual to have at least a portion of the frame which passes underneath the load. This is to provide the necessary load-bearing capability to lift the cargo clear of the ground and so transport it.

The present invention seeks to provide a cargo cycle with improved loading and carrying capabilities.

Some or all of these aims (and others that will be evident to the skilled person) are met by the present invention in its various aspects, as will be evident from the following description.

SUMMARY OF THE INVENTION

According to one aspect of the invention there is provided a cargo cycle comprising a substantially arcuate frame, at least one front wheel pivotally mounted towards a front end of the frame, at least one rear wheel pivotally mounted towards a rear end of the frame, and a propulsion drive, wherein the frame defines a cargo storage area located under the frame and between the front and rear wheels.

The arc of the frame of the cargo cycle may decreases in radius from the rear end towards the front end. The front end of the frame may be oriented towards the rear end. The frame may be hollow in section. The frame may be rectangular in section.

The cargo cycle may comprise one or more lifting mechanisms to lift a cargo clear of the ground into the cargo storage area. The lifting mechanisms may comprise linear actuators configured to engage connecting points on a cargo container.

The propulsion drive of the cargo cycle may be an electric motor. The propulsion drive may be manually powered.

The cargo storage area of the cargo cycle may be configured to house a cargo container suitable for storing sub-containers.

The front wheel of the cargo cycle may be steerably mounted on the frame. The cargo cycle may further comprise a seat.

One or more of the lifting mechanisms of the cargo cycle may be slidably mounted to the frame.

According to a second aspect of the invention there is provided a cargo container for use in a cargo cycle comprising a housing, one or more wheels, one or more removable sub-containers, wherein the container comprises connecting points for connecting with a cargo cycle and the sub containers are locked in place during transit.

The cargo container may further comprise one or more retractable wheels. The cargo container may comprise a locking system configured to selectable engage with the sub-containers to allow locking and unlocking of selected sub-containers.

Following is a description by way of example only and with reference to the accompanying drawings of one mode for putting the present invention into effect.

Figure 9:
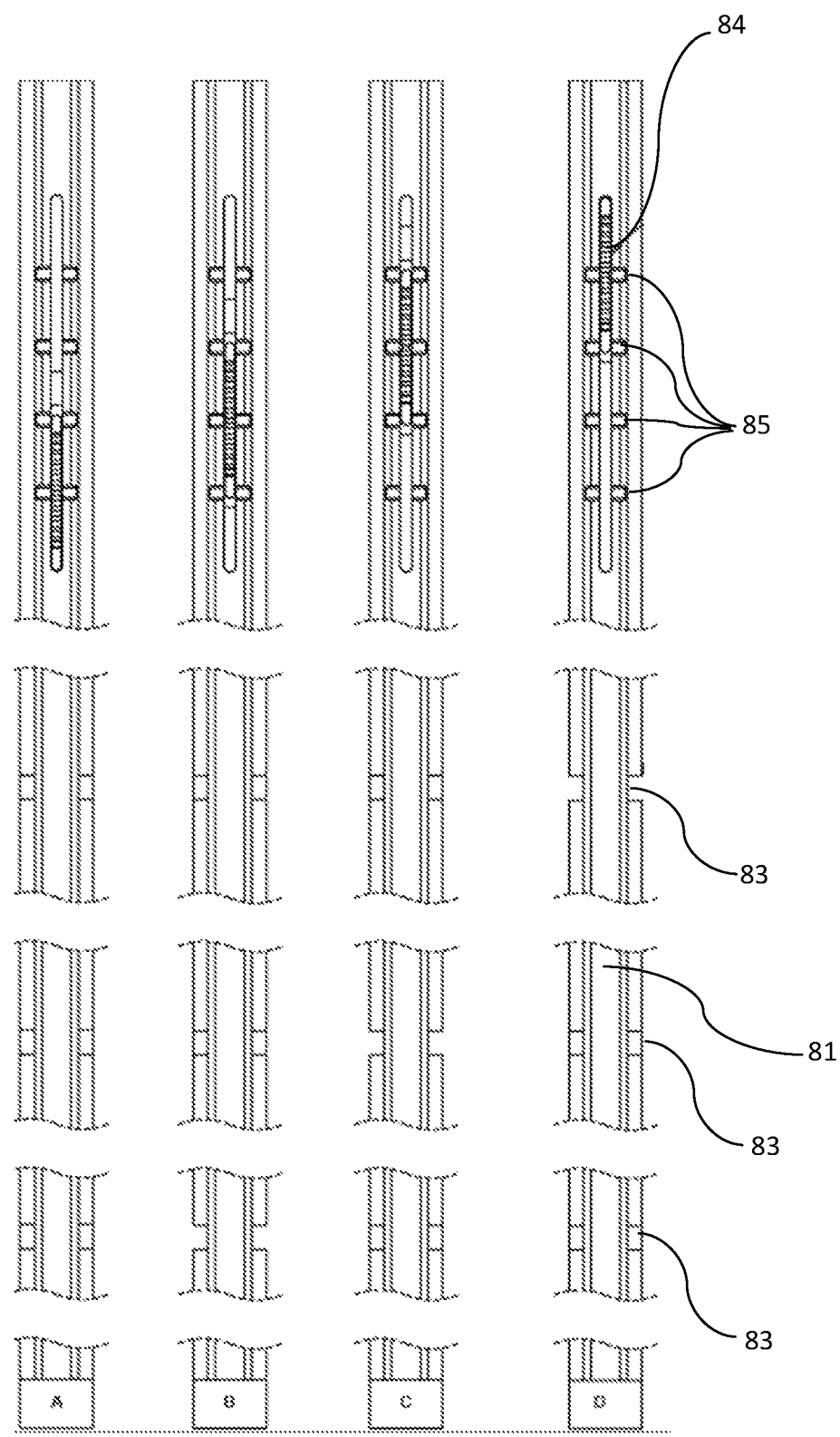
Figure 10:
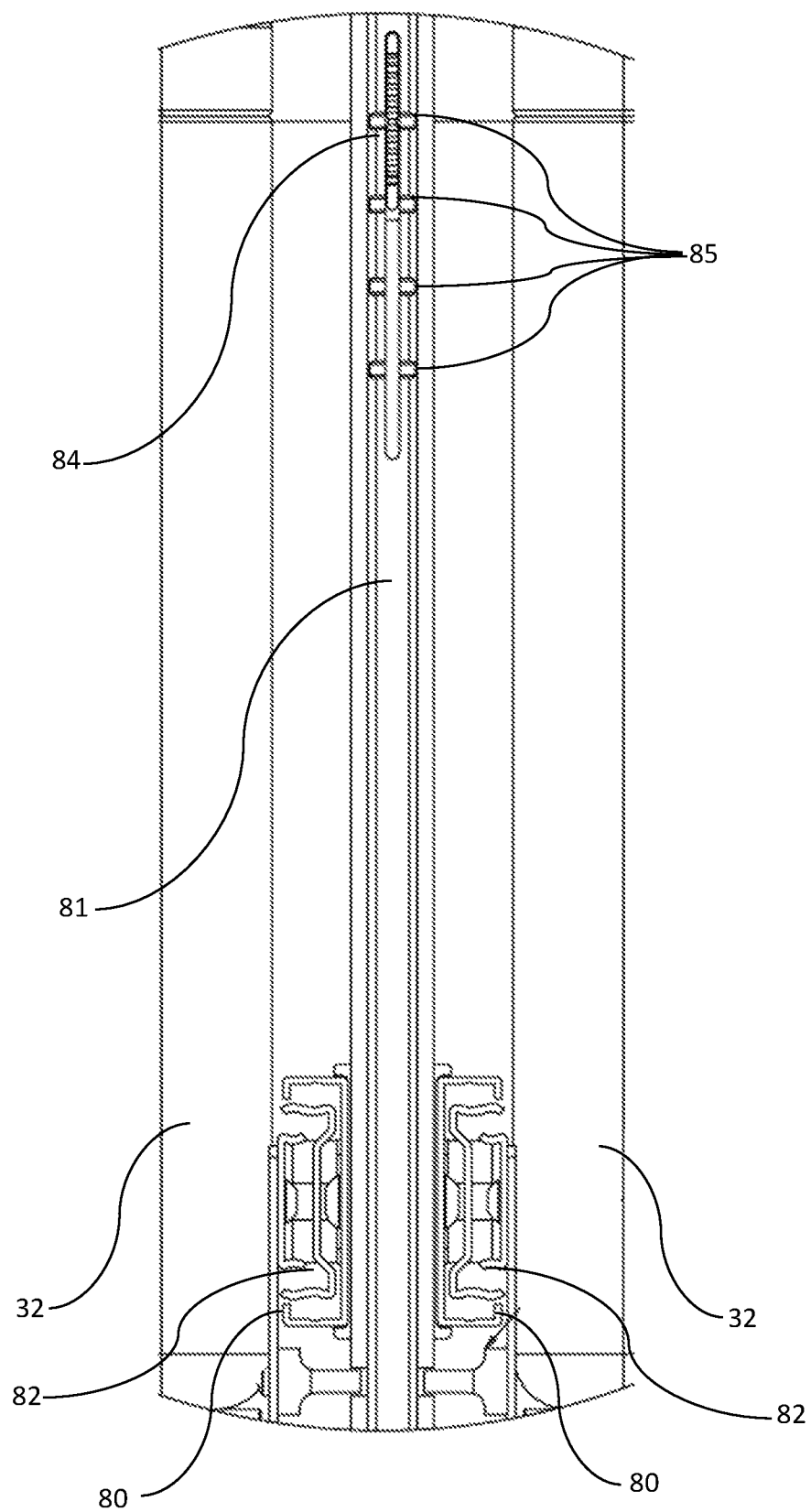
Figure 11:
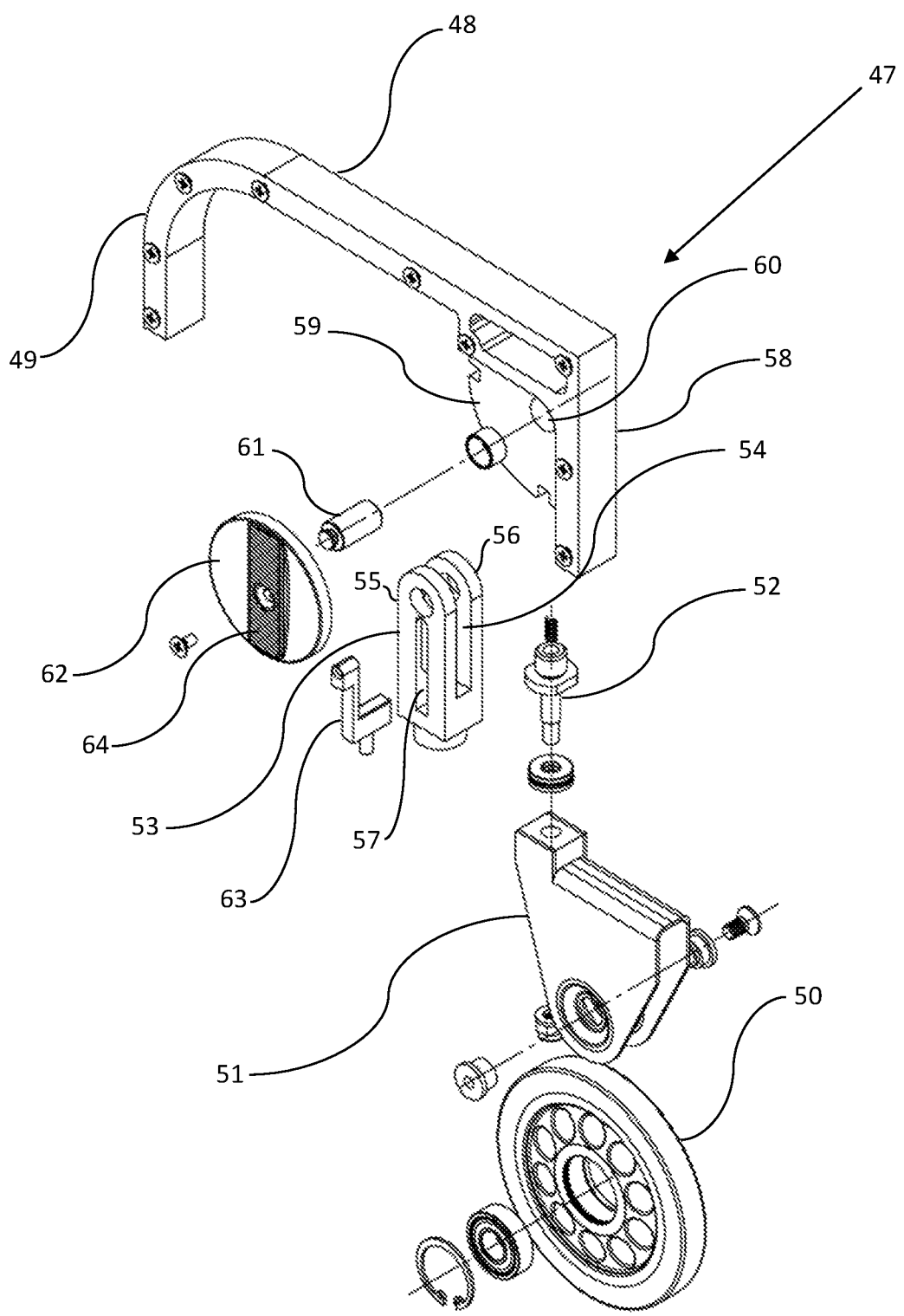
Figure 12:
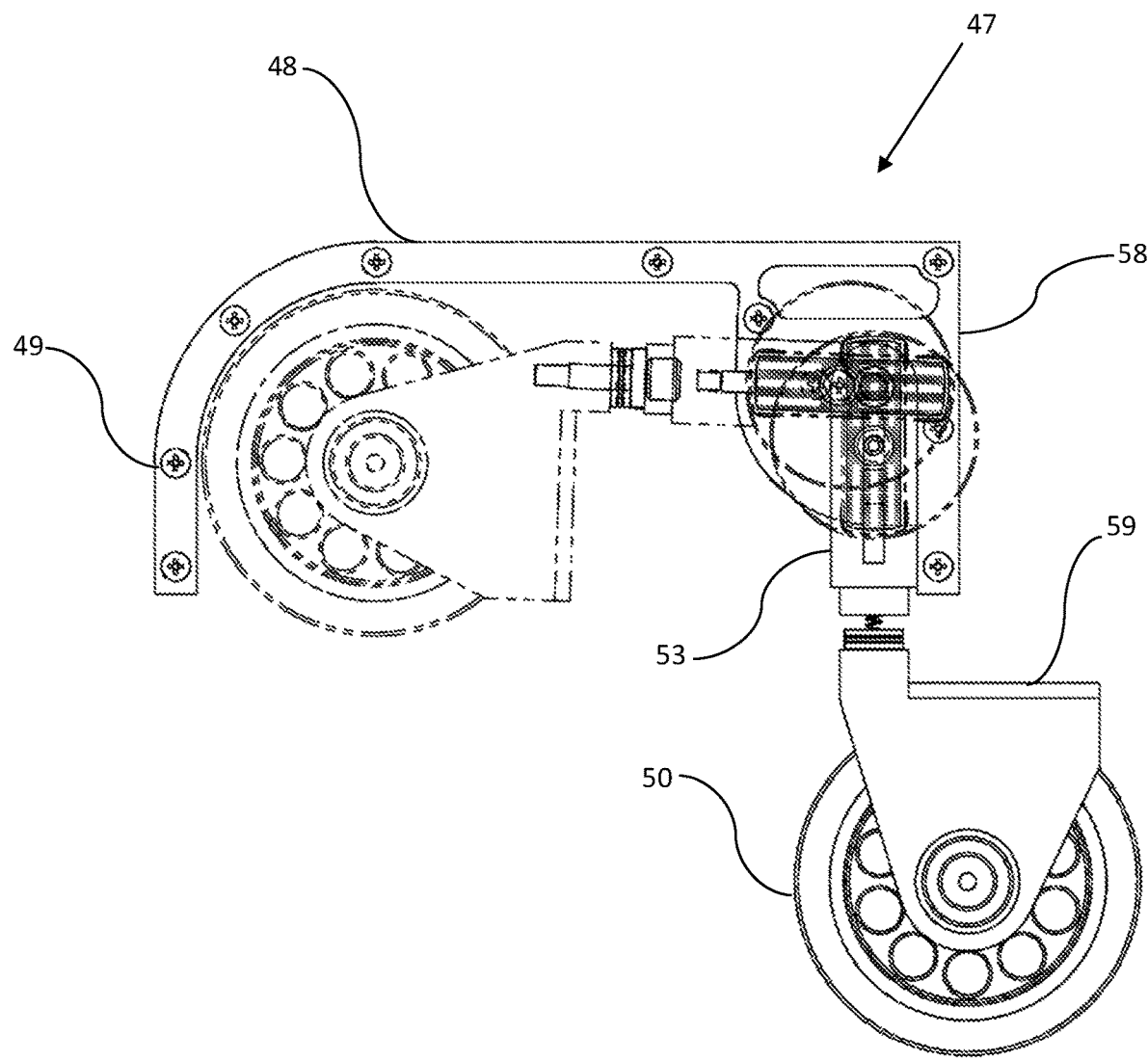
Figure 13:
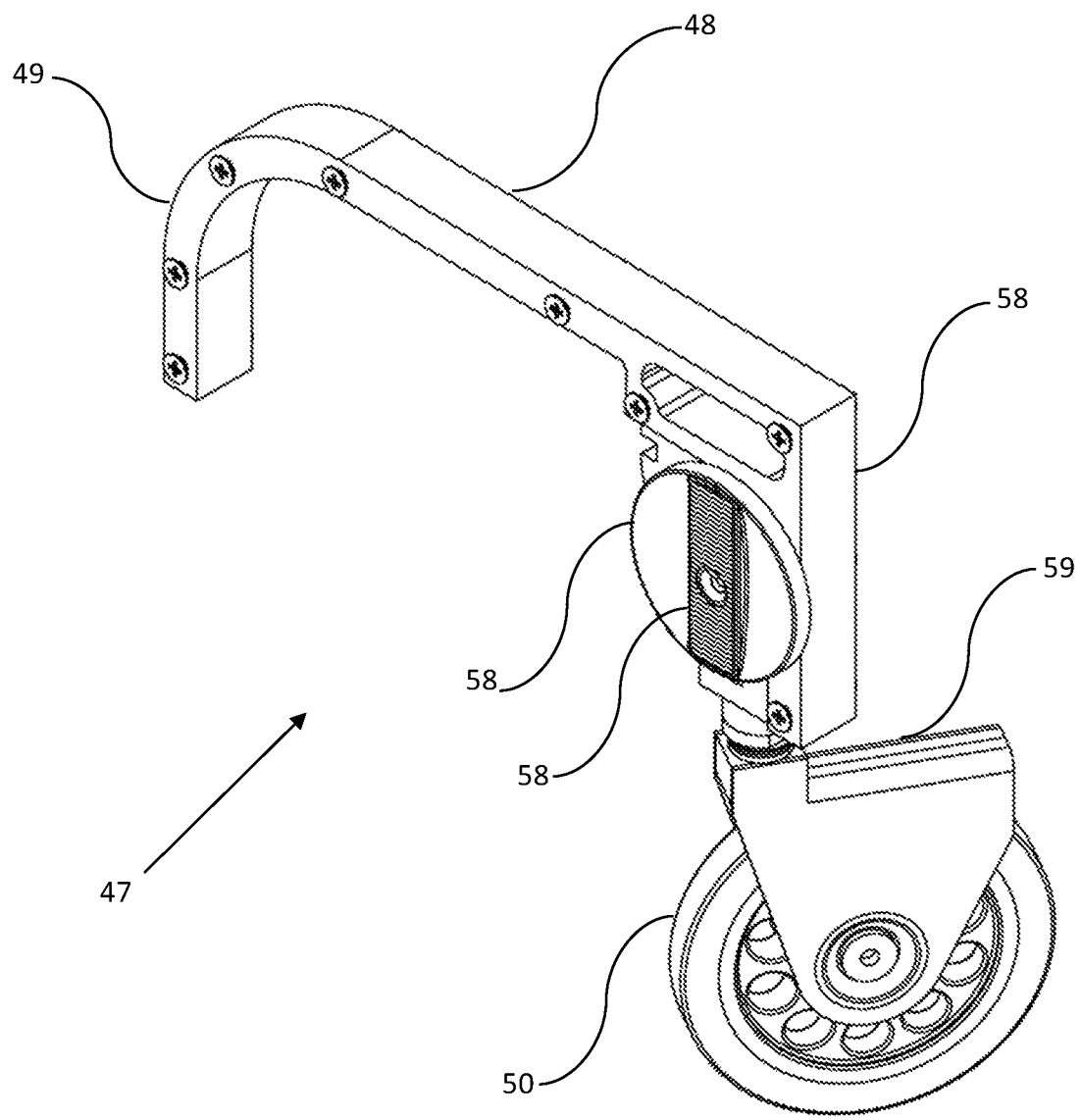
Figure 14:
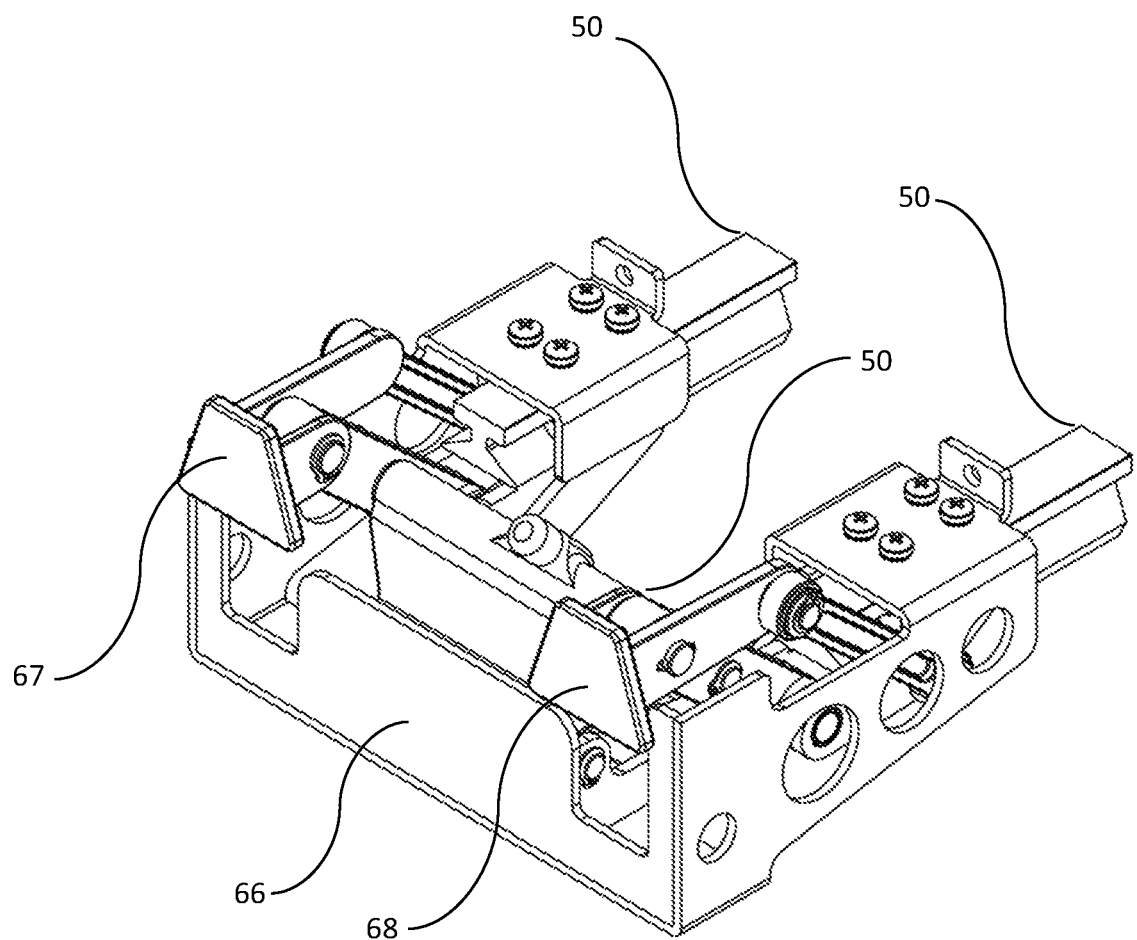
Figure 15:
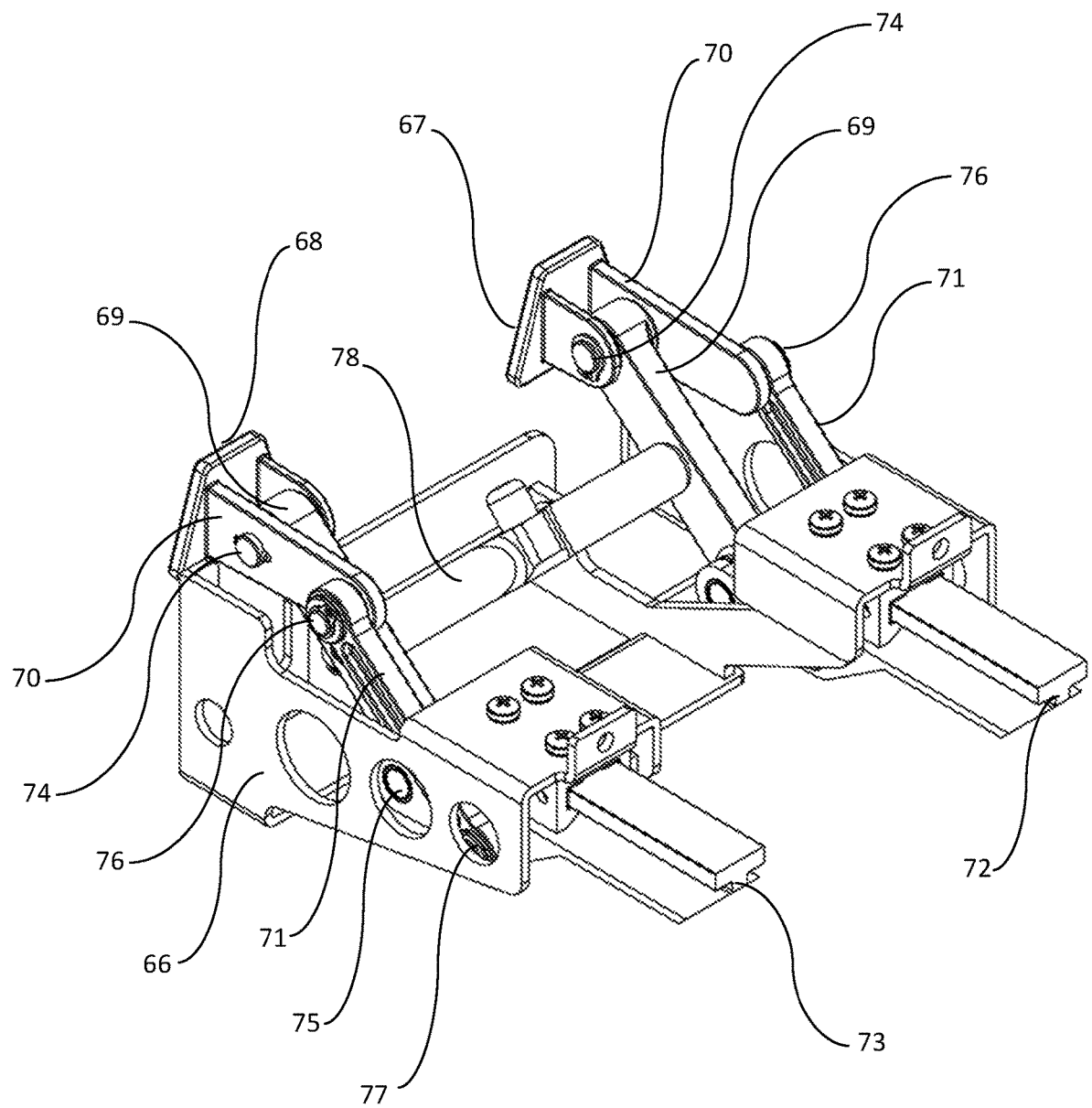
Figure 16A:
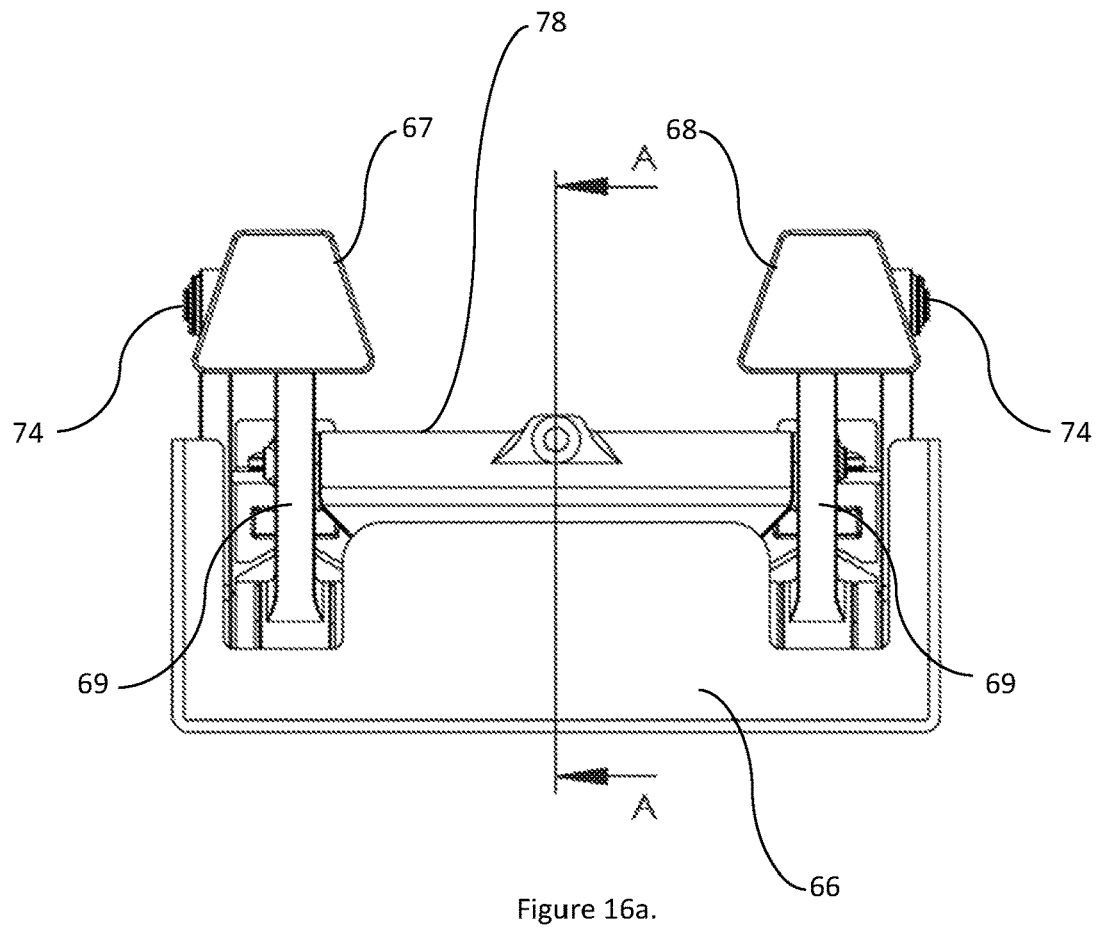
Figure 16B:
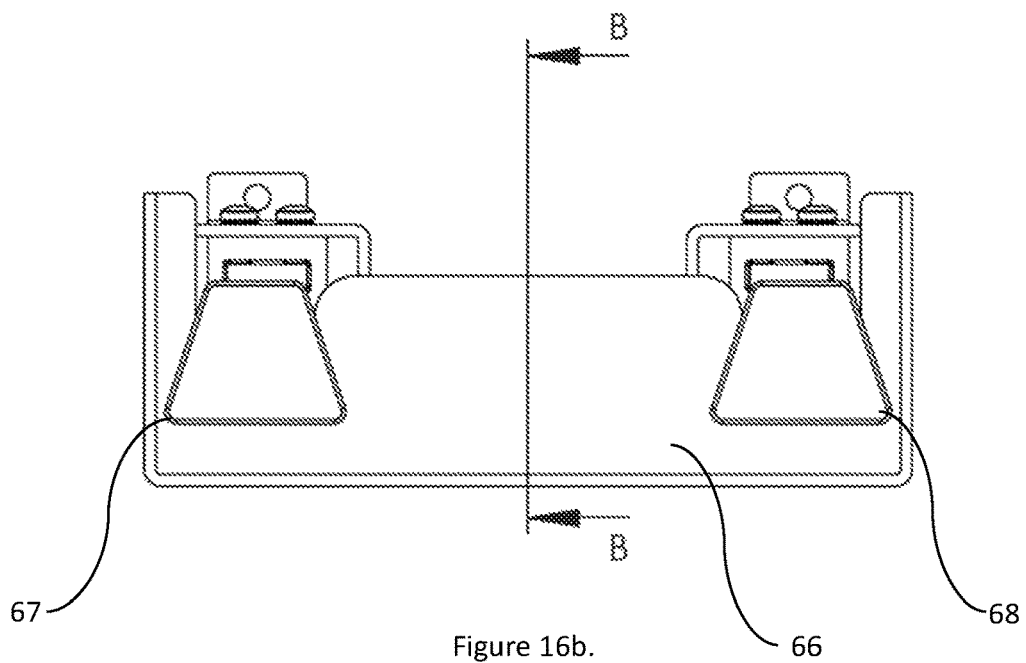
Figure 17A:
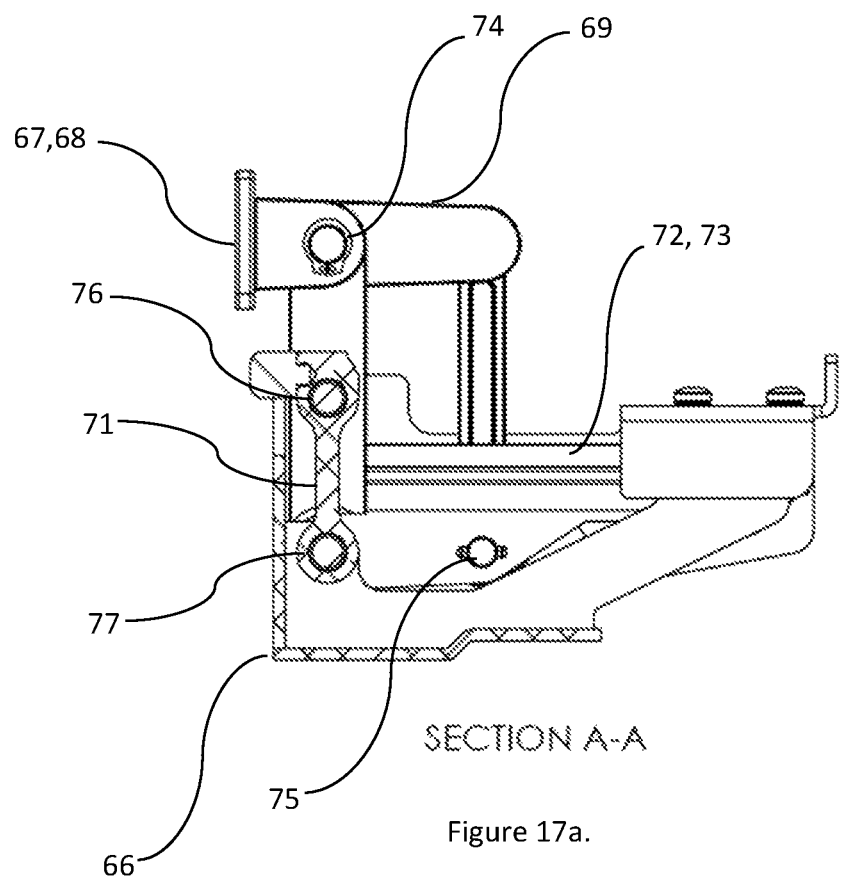

FIG. 9 is a side view of an anti-tip mechanism in four positions of engagement FIG. 10 is a perspective view of an anti-tip mechanism FIG. 11 is an exploded view of a folding wheel assembly FIG. 12 is a side view of a folding wheel assembly FIG. 13 is a side perspective view of a folding wheel FIG. 14 is a rear perspective view of a lifting mechanism FIG. 15 is a front perspective view of a lofting mechanism FIG. 16a is rear view of a lifting mechanism in a lowered configuration FIG. 16b is rear view of a lifting mechanism in a raised configuration FIG. 17a is a side section view od FIG. 16a

Figure 17B:
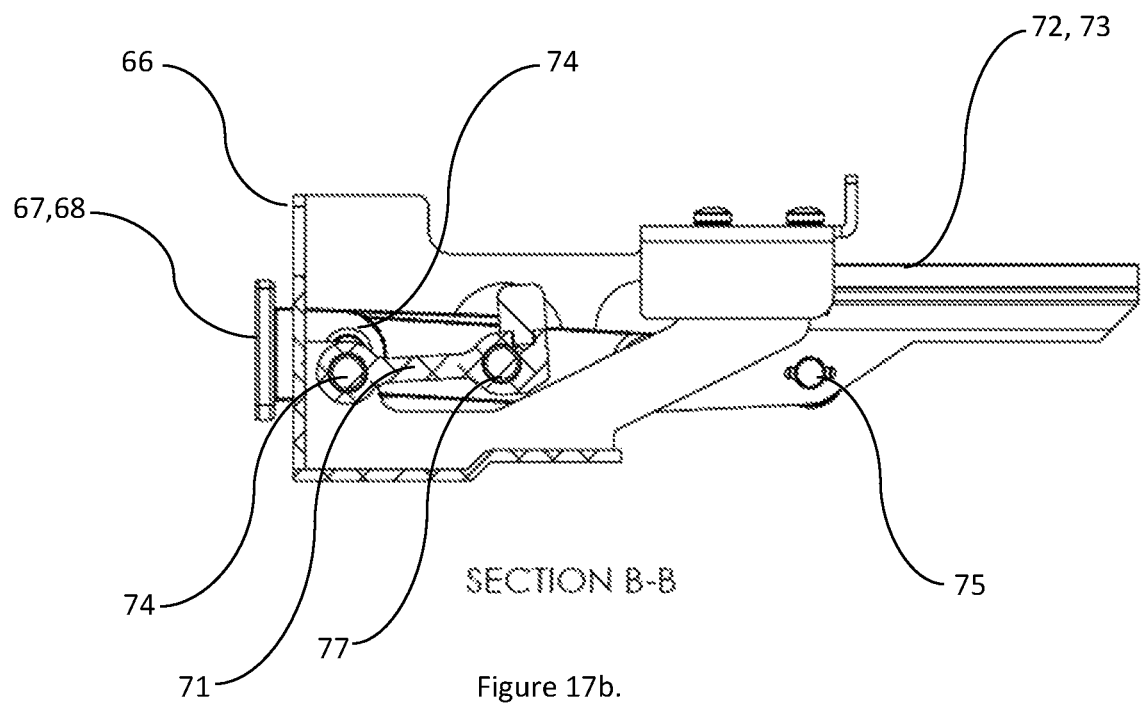

FIG. 17b is a side section view of FIG. 16b

Figure 18:
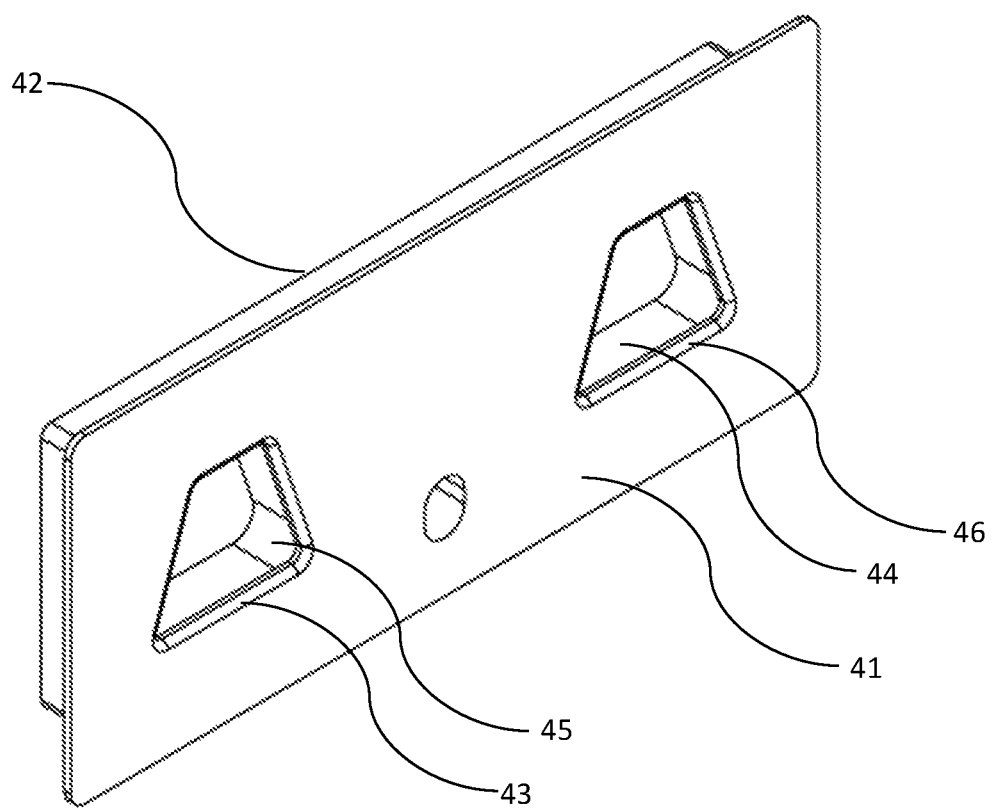

FIG. 18 is a front perspective view of a lift mechanism connecting point

Figure 19:
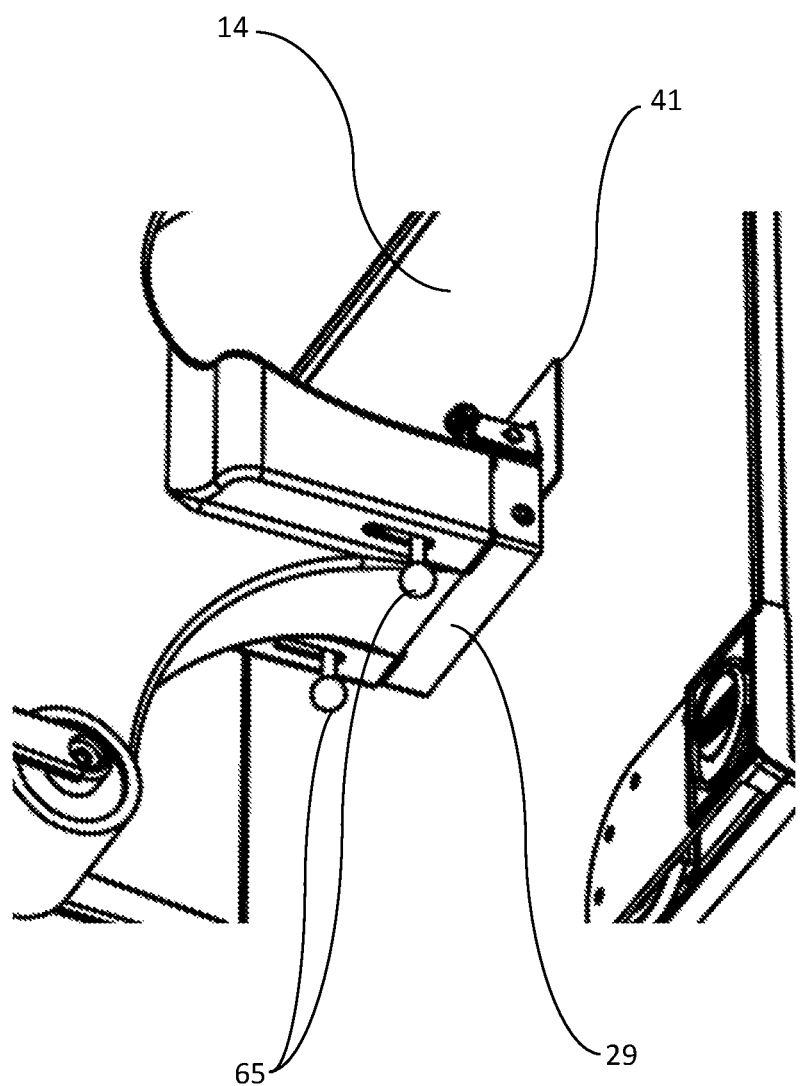

FIG. 19 is a perspective view of the underside of a cargo container and frame connection.

Figure 1:
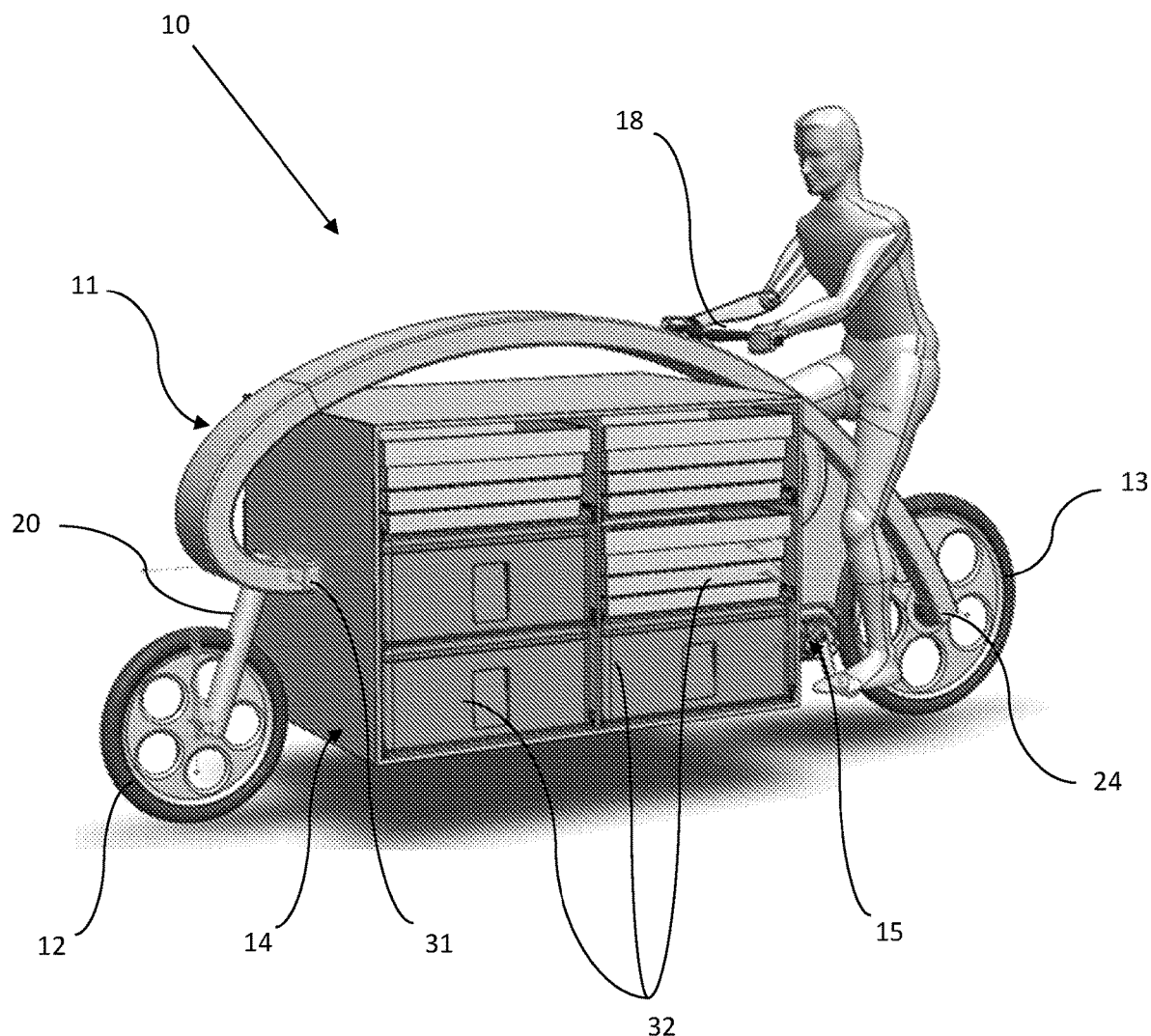
FIG. 1 is a side perspective view of an embodiment of the cargo cycle

FIG. 1 shows a side perspective view of the cargo cycle 10. The cargo cycle comprises a frame 11, a front wheel 12, a rear wheel 13, a cargo container 14, a propulsion drive 15, a seating means 16 and a steering means 17. The steering means comprises handlebars 18, steering linkage 19, control cables (hidden) and a steering head 20. The seating means 16 comprises a seat 21, a seat mounting 22 and a seat post 23. The steering linkage cables may be flexible. Flexible cables allow linkage from the steering head 20 to the wheels through the frame 11.

Figure 2:
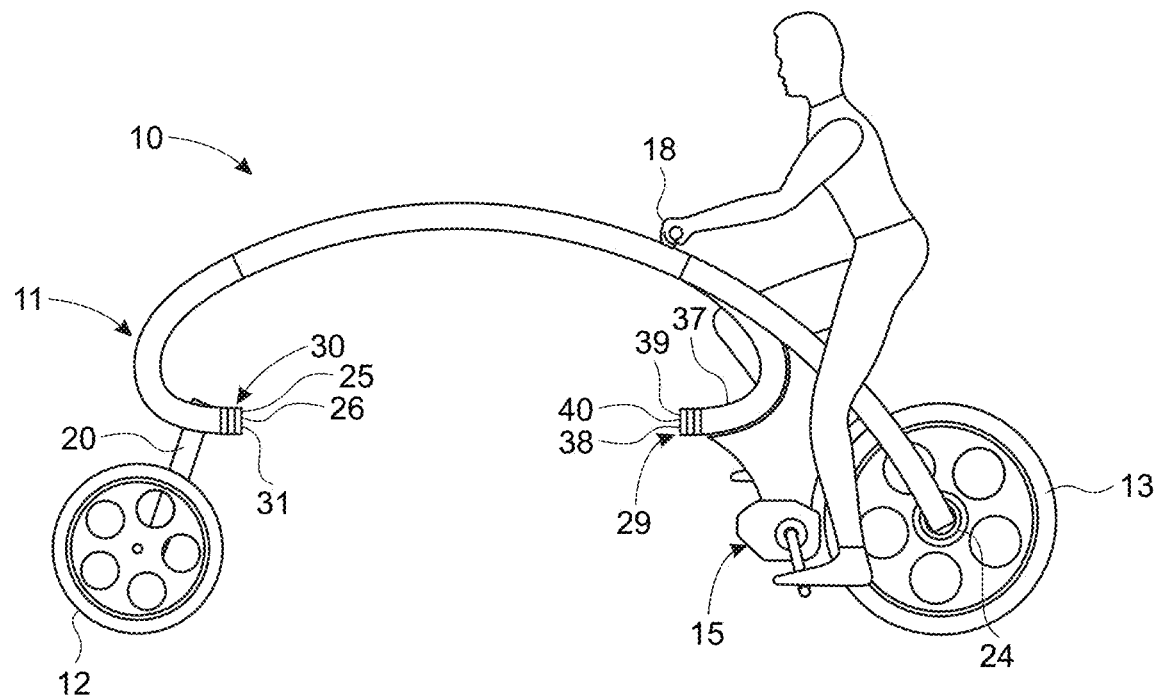
FIG. 2 is a side view of an embodiment of an unloaded cargo cycle
Figure 3:
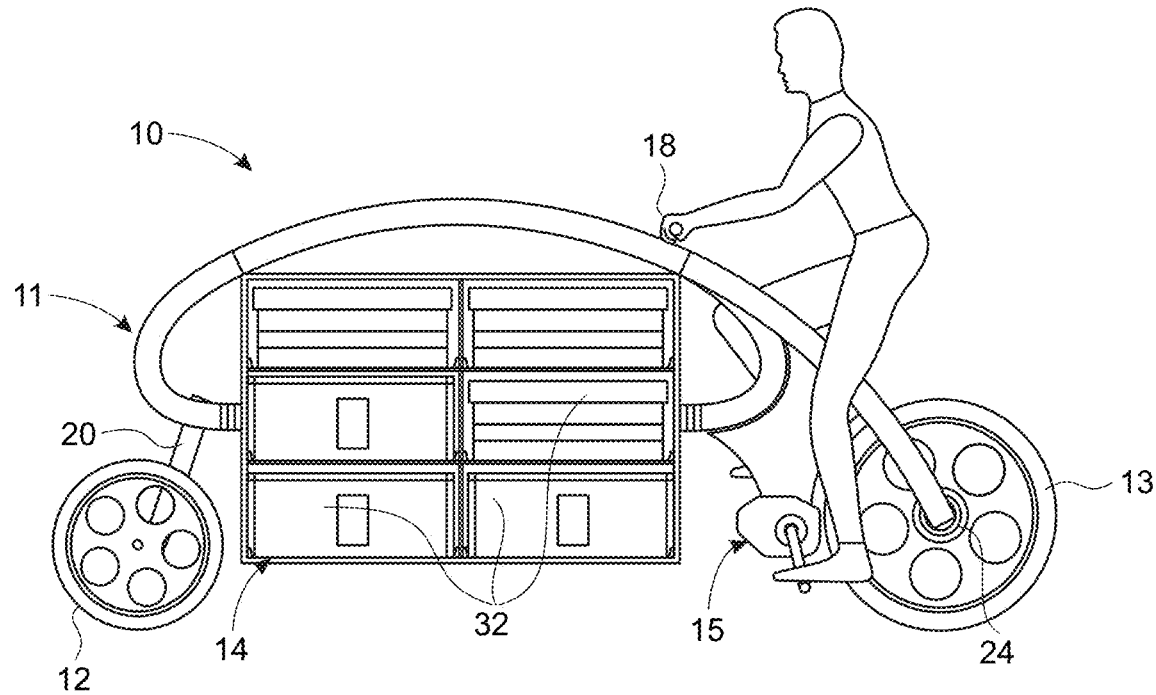
FIG. 3 is a side view of an embodiment of a loaded cargo cycle
Figure 4A:
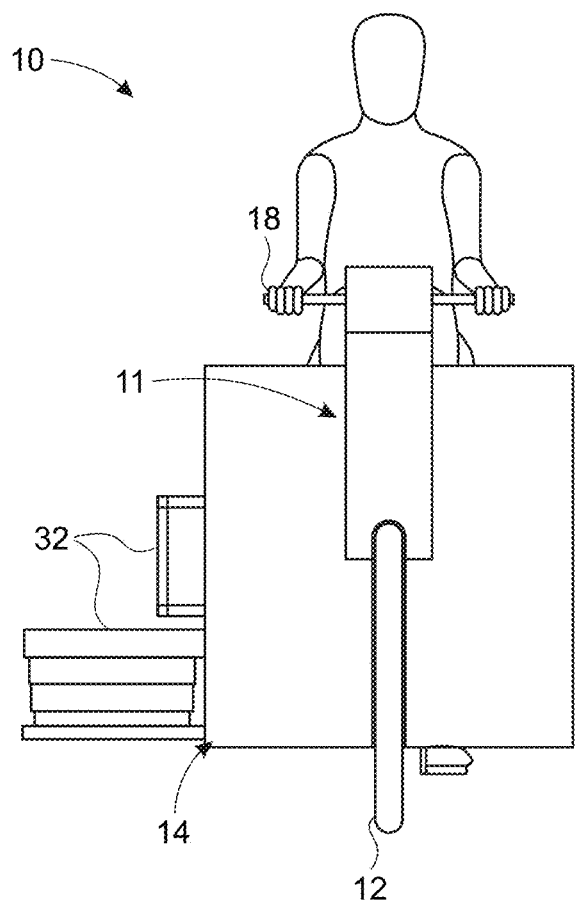
FIG. 4a is a front view of an embodiment of a loaded cargo cycle
Figure 4B:
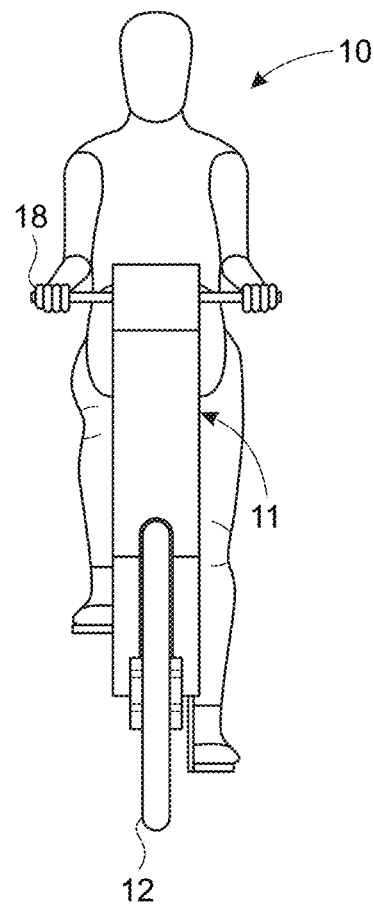
FIG. 4b is a front view of an embodiment of an unloaded cargo cycle
Figure 5:
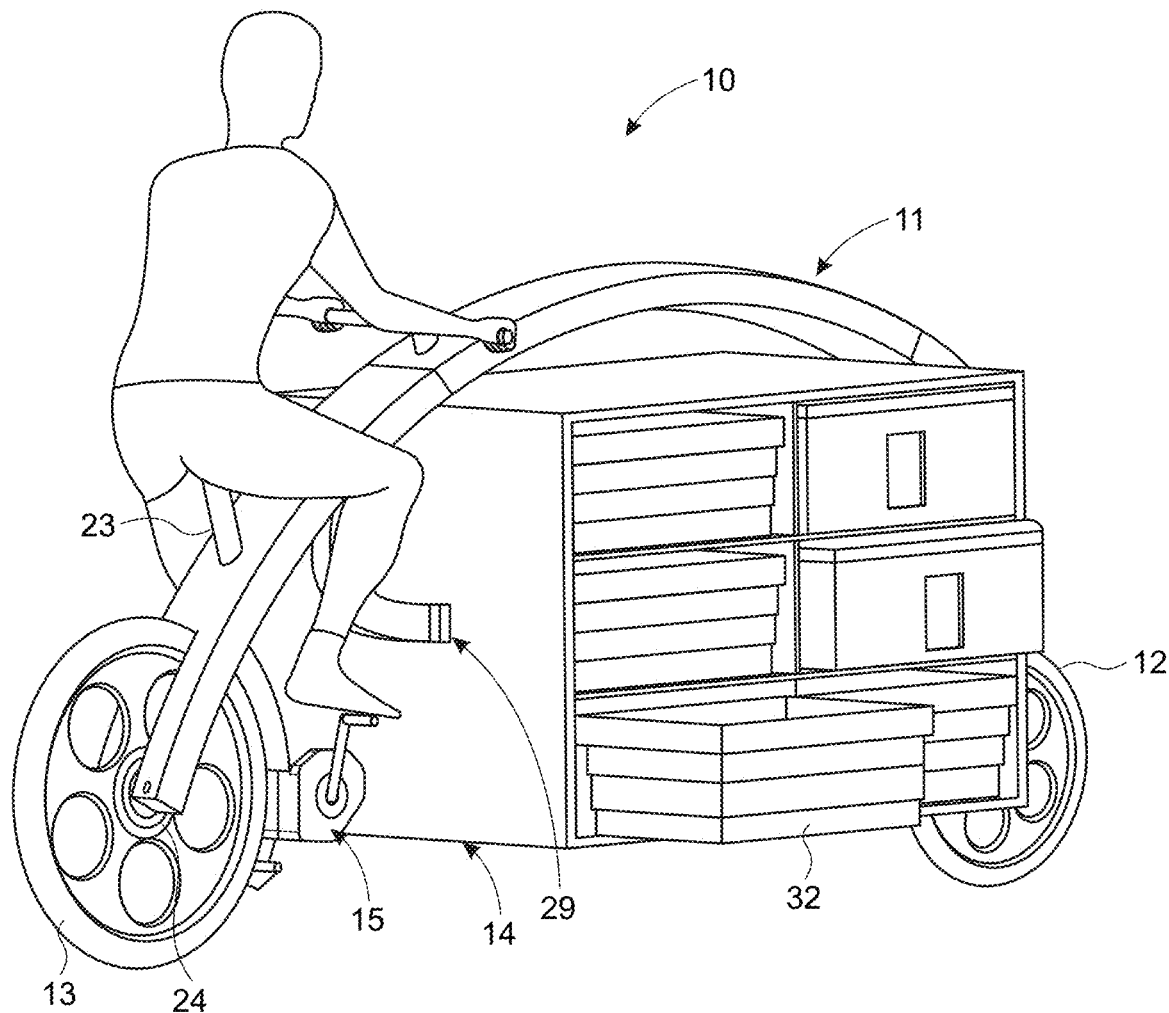
FIG. 5 is a rear perspective view of an embodiment of the cargo cycle

In an embodiment the frame 11 is arcuate in form. As shown in FIGS. 2 and 3, the radius of the arc of the frame projects forward from a rear axle 24 of the rear wheel 13 up and over the cargo container 14. The size of the radius decreases towards the front steering head 20 such that the frame curves to face towards the rear of the cycle. The radius of the frame flattens out after the frame 11 has passed the steering head 20 and continues horizontally towards a connection point 25, 26 with the cargo container. Therefore, the front end of the frame curves to be oriented towards the rear of the bike. The flattened front end of the curve terminates with an open end 31 of the hollow section of the frame.

Towards a rear region of the frame a rearward section 37 branches off from the main frame 11 (shown in FIG. 2). The rearward section 37 branches from the main frame 11 in a direction towards the rear wheel 13 before arcing towards the front of the cycle. The rearward section 37 terminates with an open end 38 which faces the open end 31 of the front section of the frame. The rearward section 37 is configured to provide connection points 39, 40 to the rear of a cargo container 14.

As shown in FIGS. 2 and 3 the arcuate trajectory of the frame defines a space within the inside of the curve, said space accommodates the cargo container 14. As the frame 11 curves up and over the cargo container the inner surface of the frame may be tangential or close to tangential to the upper corners 27, 28 of the cargo container 14.

The arcuate design of the frame 11 provides structural and functional benefits to the performance of the cargo cycle 10 both when unloaded and loaded with cargo. The decreasing radius of the frame towards the front end of the cycle transmits the force acting on the cargo connection points 25, 26, 39 and 40 to the steering head 20 without reliance on the main section of the frame. Transmitting load paths acting in the X, Y and Z axes of frame which are imparted by the cargo 14 to the steering head 20 therefore improves the rigidity and strength of the frame. Further, the forces acting on the connecting points 25, 26, 39 and 40 between the cargo 14 and frame 11 are reduced, this provides improvements to the structural integrity of the cycle.

The frame 11 may comprise a rear lifting mechanism 29 housed in the open end 38 of the rearward section 37 of the frame 11. The frame may comprise a front lifting mechanism 30 housed in the open end 31 of the front end of the frame 11. Each of the front and rear lifting mechanism 29, 30 may comprise one or more linear actuators (hidden) configured to convert linear actuation into vertical movement. Linear actuation is converted to vertical movement of the lifting mechanism 29, 30 through the use of a modular assembly such as a Scott-Russell mechanism.

FIGS. 14 and 15 show detailed views of the lifting mechanisms 29, 30. The lift mechanisms comprise a support structure 66 which houses the inner components of the lift mechanism. The support structure 66 is configured to fit into the open ends 31, 38 of the frame 11. The internal components of the lift mechanism include a pair of engaging faces 67, 68 which are operably linked to a first, second and third linkage arm 69, 70, 71 (mirrored on each side of the lift mechanism). The engaging faces 67, 68 are linked to a pair of rails 72, 73. The rails 72, 73 are linked to the engaging faces by the first linkage arm 69, which is connected at two rotating pivot points 74, 75. The rails 72, 73 are also attached to the engaging faces 67, 68 by the second and third linkage arms 70, 71. The second and third linkage arms are connected by two further rotating pivot points 76, 77. The dual linkage arrangement allows the transfer of horizontal motion of the rails 72, 73 to vertical motion of the engagement faces 67, 68 to lift the cargo container 14. A crossbar 78 links two of the linkage arms 69 to improve strength and rigidity of the structure.

The rear lifting mechanism 29 may be movable within the open end 38 of the rearward section 37 of the frame 11 such that the lifting mechanism 29 is movable towards the front of the cycle. This allows a user to decrease or increase the distance between the front and rear lifting mechanisms 29, 30. FIG. 19 shows a rear lifting mechanism comprising a pair of sliding knobs 65 protruding from the base of the lifting mechanism.

The front lifting mechanism 30 may be movable within the open end 31 of the front end of the frame 11 such that the lifting mechanism 29 is movable towards the rear of the cycle. This allows a user to decrease or increase the distance between the front and rear lifting mechanisms 29, 30.

Such a lifting mechanism allows one or both lifting mechanisms 29, 30 to engage with a corresponding connecting point on a cargo container and raise the cargo container from the ground and into a transit position within the frame. FIGS. 2, 3, 4a and 4b show side and front views of the cycle in loaded and unloaded arrangements. Said lifting mechanism increases loading speed and eliminates the need for external loading equipment such as ramps, cranes or jacks. The lifting mechanism 29, 30 is not limited to a Scott-Russell mechanism, other suitable lifting mechanisms known in the art may be suitable.

The connecting point 40 is shown in FIG. 18. The connecting point 40 comprises a rectangular face 41, a collar 42 inset from the rear of the rectangular face 41, and a pair of receiving holes 43, 44 configured to receive and engage with the engaging plates of the lifting mechanism to lift the cargo container 14. The receiving holes 43, 44 comprise collars 45, 46 which travel from the front to the rear of the connecting point 40. The receiving holes are isosceles trapezoid in shape, however, other suitable engaging shapes may be used. A connecting point 40 is mounted in a central forwards facing region of the cargo container 14 and configured to address a lift mechanism 29 in the front part of the frame. A connecting point 40 is mounted in a central rearwards facing region of the cargo container 14 and configured to address a lift mechanism 30 in the rear part of the frame.

FIGS. 16a, 16b, 17a and 17b show side and front views of the lifting mechanisms in both lowered and lifted configurations.

The modular assembly of the lifting mechanism 29, 30 allows a single mechanism to be slid into the corresponding open end 31, 38 of the frame, thus reducing time and cost of manufacture.

The frame 14 may be hollow to provide housing for internal components such as steering linkage 19, cargo lifting mechanisms 29, 30, brake wiring (hidden), propulsion drive 15 or other necessary cycle components. The frame may be rectangular in section. Other frame sections may be used such as square or oblong.

The front and rear lifting mechanisms 29, 30 are configured to lift and fix or lower the cargo containers 14. The rear or front lifting mechanisms may be configured to slide horizontally towards each other. This provides the benefit of allowing one end of the cargo container to be fixed to a lifting mechanism before sliding the corresponding lifting mechanism into a loading position. The containers 14 are designed to house sub-containers (shown as 32 in FIGS. 1, 3, 4a and 5) of both rigid and flexible construction. The sub containers 32 are consistent with international logistics standards. The sub containers 32 allow for temperature-controlled storage and delivery of food, medicines or similar items which require temperature control.

The cargo containers 14 may comprise sliding panels 79 which cover the lateral sides of the container 14. The panels may be slid up by a user to access the sub containers 32 within the container 14. The sliding panels 79 enclose the sub containers within the cargo container 14 when closed.

Figure 8:
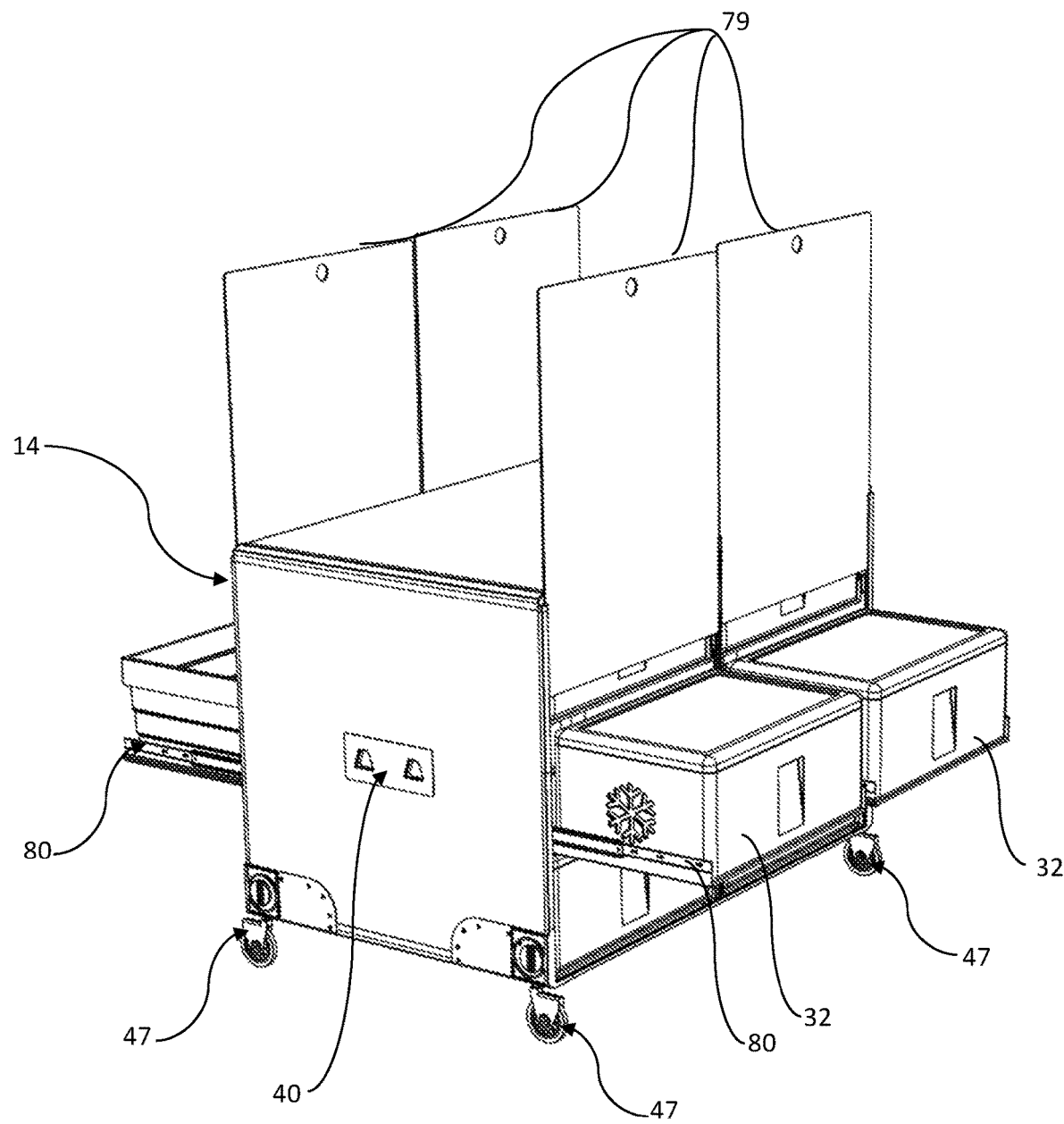
FIG. 8 is a front perspective view of an open cargo container

The sub containers 32 are inserted into the cargo container using a sliding rail system with an anti-tip mechanism. An end view of the rails 80 is shown in FIG. 10. The rails 80 are also shown in FIG. 8. The rails 80 interact with runners 82 which slide along the rails 80 to move the sub-containers 32 out of the cargo container 14. The runners 82 comprise a plurality of slots along their length.

FIGS. 9 and 10 show the anti-tip mechanism. The anti-tip mechanism comprises a blade 81 which is housed in the cargo container 14 between two columns of sub-containers 32. The blade may be made from steel or any other suitable rigid metal. The runners are preferably made from a plastic, though a skilled person would understand that a suitable equivalent may be used. The blade is "keyed" with openings 83 which align with slots in runners.

A selector switch 84 is attached to the blade 81. The blade 81 is configured to engage with a plurality of locating slots 85. Each locating slot 85 corresponds to slots in the runners 82. FIG. 9 shows four positions, positions A to D. In position A the selector switch is in a first locating slot and all of the sub-containers are unable to slide out (locked). Positions B, C and D show the selector switch in second third and fourth positions which correspond to second, third and fourth rows of sub-containers 32. In each of these positions the slots 83 of the blade 81 and the runners align which allows the corresponding sub-container to be slid out (unlocked). In transit, the selector switch 84 may be set to lock all of the sub-containers in place. To unload the containers the user unlocks the desired containers by moving the selector switch 84 to the corresponding position. In this configuration, drawers which are side by side may be opened simultaneously.

Figure 6:
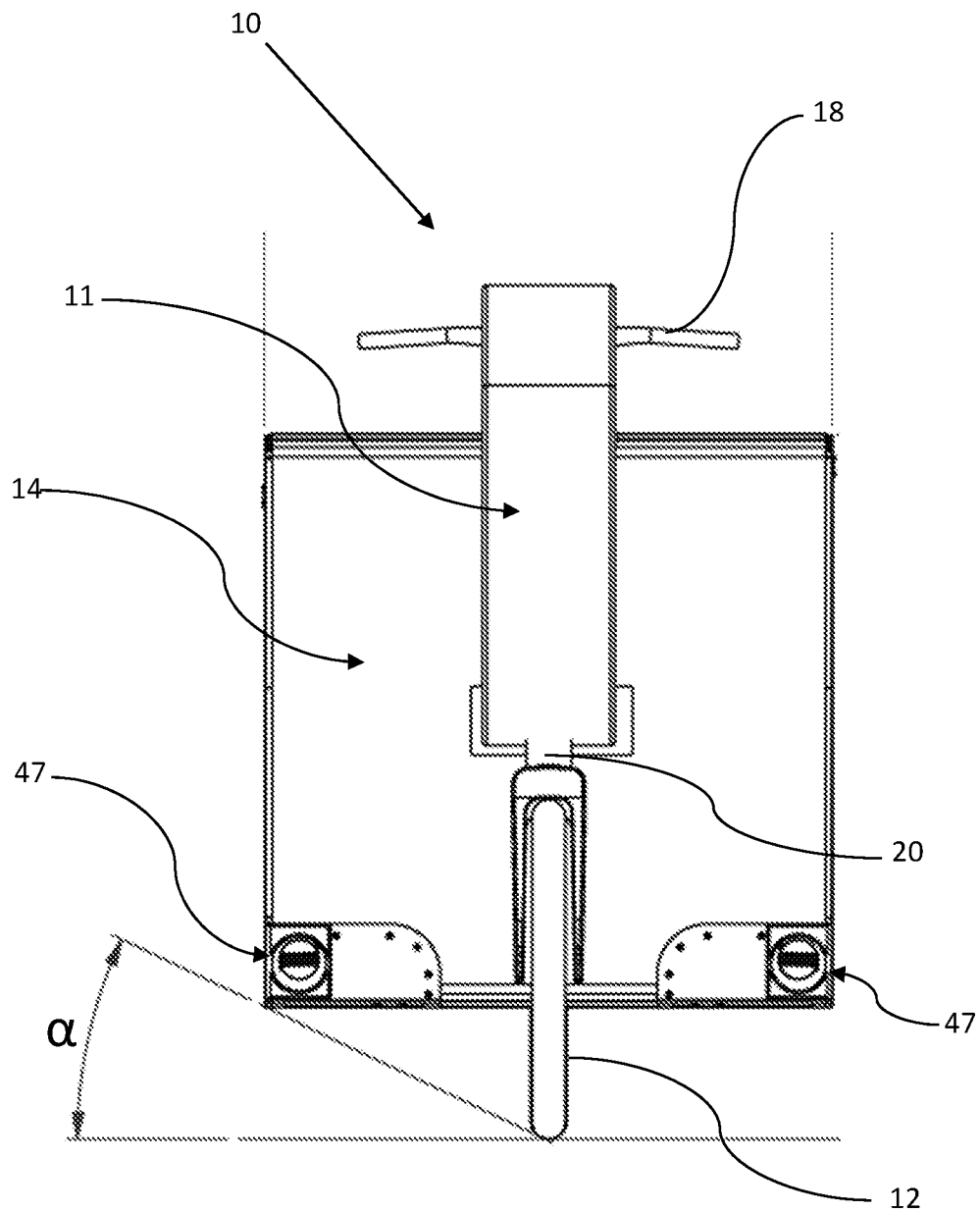
FIG. 6 is a front view of an embodiment of a loaded cargo cycle
Figure 7:
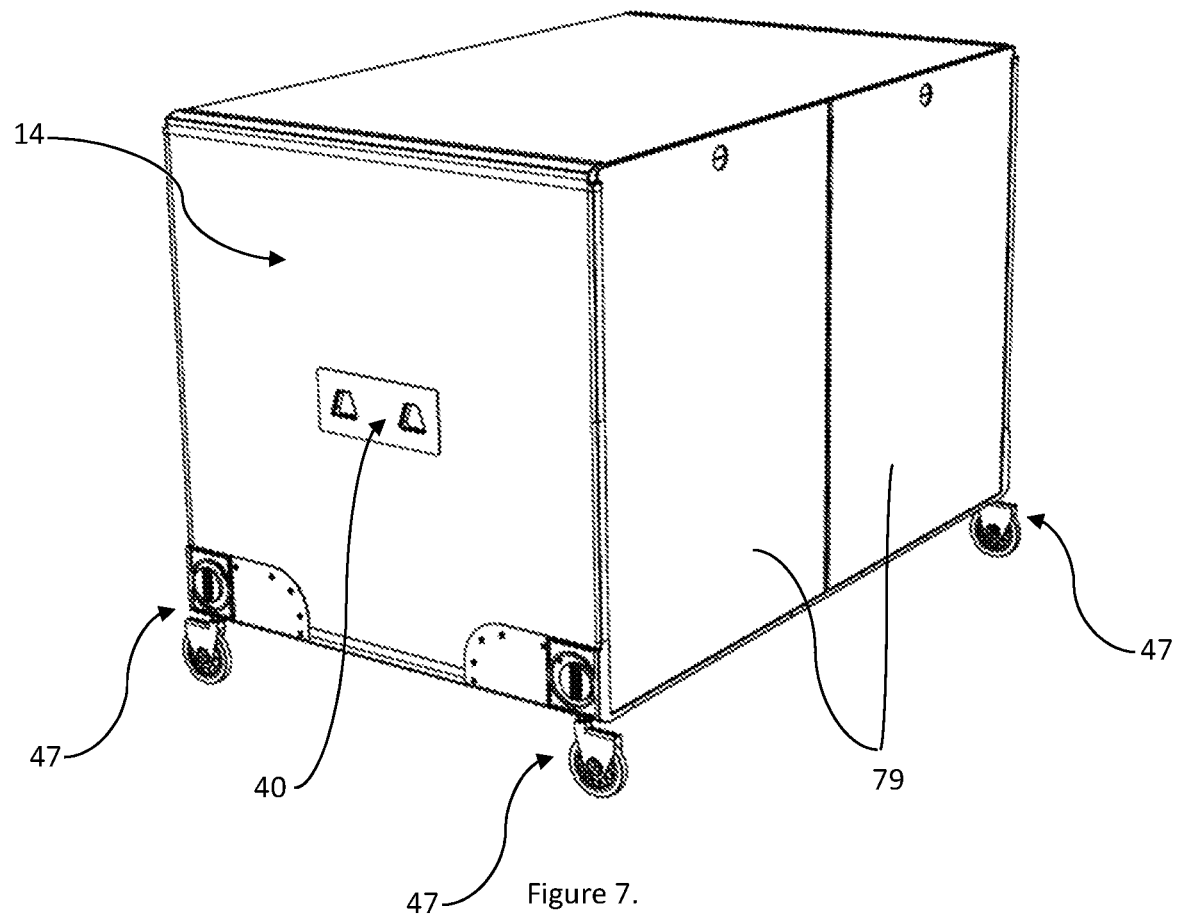
FIG. 7 is a front perspective view of a closed cargo container

The cargo container 14 is lifted into the transit position by the lifting mechanism. To avoid undesired external parts which may be damaged during transit, wheels of the cargo container fold into a retracted position on the cargo container 14. This avoids the need for trolleys or other additional machinery for transporting the cargo container to the cycle. FIG. 6 shows the retractable position of the wheels at front facing corners of the cargo container 14. Opposing positions are located on the rear facing corners of the cargo container 14. FIG. 7 shows the wheels in an unfolded configuration, supporting the weight of the cargo container 14.

FIG. 11 shows an exploded view of a folding wheel assembly 47 used in an embodiment of the invention. The wheel assembly 47 comprises a support arm 48 in a substantially inverted u-shape arrangement. A distal end 49 of the support arm 48 is curved to accommodate the radius of a castor wheel 50. A proximal end 58 of the support arm 48 comprises a right-angled bend and a radiused cheek portion 59 on the inside corner of the proximal end 58 of the support arm 48. The cheek portion 59 comprises a through hole 60 for locating a pin 61.

The castor wheel is connected to a sleeve 51 through its rotational axis such that the wheel may roll within the sleeve. The sleeve 51 is connected to a pin 52 which protrudes upwards from an upper region of the sleeve 51 and provides a swivelling connection point allowing the wheel to swivel. The pin 52 connects the sleeve 51 and wheel 50 to a guide block 53. The guide block 53 is a generally cuboid shape with a slot 54 running along a central portion therein, the slot defines a first and second side wall 55, 56. A second slot 57 passes through the guide block 53 perpendicular to the first slot 54, through the first and second walls 55, 56. The second slot 57 provides a guide for a connecting pin to slide in. The cheek 59 of the support arm 48 fits into the first slot 54 upon assembly such that the first and second side walls 55, 56 are either side of the cheek 59.

A disc 62 attaches to the pin 61. The control disc comprises a rectangular grip portion 64. An engaging arm 63 connects the disc 62 to the guide block 53. To fold the wheel assembly 47 away, a user twists the disc 62 using the grip portion 64. This rotates that wheel upwards and inwards to locate within the inverted u-shape of the support arm 48. The slots in the guide block 53 assist stowing the wheel within the support arm 48. FIG. 12 shows the wheel in a folded and unfolded position.

Loading of the cargo cycle 10 will be described hereinafter. The cargo containers 14 comprise a set of wheels (hidden) located on the base of the container which allow the containers to be maneuvered into a position under the frame 11 of the cycle 10 such that the connecting points 25 and 26 of the lifting mechanisms 29 and 30 align with the corresponding connecting points on the cargo container 14. A user may align the forward-facing connecting point of the cargo container 14 with the front lifting mechanism first. A user may then slide the movable rear lifting mechanism towards the rear connecting point of the cargo container 14 to engage with the rear connecting point. This may be achieved by sliding the knobs 65 of the rear lifting mechanism towards the cargo container 14. Once the cargo container is located a user may actuate the lifting mechanisms 29 and 30. Actuation of the lifting mechanisms engages the connecting points of the cargo container and the lifting mechanisms 29 and 30. Horizontal movement of the linear actuators within the lifting mechanisms 29 and 30 is translated to vertical movement of the cargo container 14 through the connecting points 25 and 26.

Such a lifting mechanism eliminates the need for loading platforms built into the structure of the cycle and reduces loading time and loading difficulty. This is of particular interest in operations which are time sensitive, such as food or medicine delivery. Furthermore, the design of the frame 11 provides a cycle 10 which in its unloaded configuration, occupies a reduced area in comparison to conventional cargo cycles. Benefits of the reduced cycle size include improved storage and/or charging capabilities due to the ability to store greater numbers of the cycles side-by side.

The propulsion drive 15 may comprise a housing 33 for housing either a manual or powered drive unit 36. The housing 33 may be connected to the frame 10 by connection points 34 and 35. The housing 33 may be a nacelle housing or other suitable component housing. The drive unit 36 is connected to the rear wheel 13 and configured to transmit power via a chain, belt, shaft or other suitable connecting means.

The propulsion drive 15 may be powered in full or in part by an electric motor. Where the propulsion drive 15 is powered in part by an electric motor, the cycle 10 is considered to be electric assisted wherein the user is assisted in pedaling by the electric drive means. The drive means may be manual, wherein a user is required to pedal the cycle 10 to provide drive to the rear wheel 13 without the need for an electric drive means.

The motor may be a hub drive motor or a crank drive motor, or other suitable electric motors known in the art.

The invention claimed is:

1. A cargo cycle comprising:
   a substantially arcuate frame which is hollow in section,
   at least one front wheel pivotally mounted towards a front end of the frame,
   at least one rear wheel pivotally mounted towards a rear end of the frame, a propulsion drive, wherein the frame defines a cargo storage area suspended under the frame and between the front and rear wheels;

the cargo cycle further comprising a rear lifting mechanism housed in an open end of the rear section of the frame, and a front lifting mechanism housed in an open end of the front end of the frame;

wherein the rear and front lifting mechanisms are adapted to engage with corresponding connecting points on a cargo container and raise the cargo container from the ground and into a transit position within the frame.

2. A cargo cycle according to claim 1 wherein the arc of the frame decreases in radius from the rear end towards the front end.

3. A cargo cycle according to claim 2 wherein the front end of the frame is oriented towards the rear end.

4. A cargo cycle according to claim 3 wherein the frame is rectangular in section.

5. A cargo cycle according to claim 1 wherein the rear and front lifting mechanisms comprise linear actuators configured to engage connecting points on a cargo container.

6. A cargo cycle according to claim 1 wherein the propulsion drive is an electric motor.

7. A cargo cycle according to claim 1 wherein the propulsion drive is manually powered.

8. A cargo cycle according to claim 1 wherein the cargo storage area is configured to house a cargo container suitable for storing sub-containers.

9. A cargo cycle according to claim 1 wherein the front wheel is steerably mounted on the frame.

10. A cargo cycle according to claim 1 further comprising a seat.

11. A cargo cycle according to claim 1 wherein one or more of the rear and front lifting mechanisms is slidably mounted to the frame.

12. A cargo container for use in a cargo cycle according to claim 1 comprising:

a housing, one or more wheels, one or more removable sub-containers, wherein the container comprises connecting points for connecting with a cargo cycle and the sub containers are locked in place during transit.

13. A cargo container according to claim 12 further comprising one or more retractable wheels.

14. A cargo container according to claim 13 wherein the container comprises a locking system configured to selectably engage with the sub-containers to allow locking and unlocking of selected sub-containers.

* * * * *